United States Patent [19]
Costanzo et al.

[11] Patent Number: 6,158,131
[45] Date of Patent: *Dec. 12, 2000

[54] COLLAPSIBLE SAW

[75] Inventors: Frank T. Costanzo, Phoenix, Ariz.;
Robert R. Noyes, Winnipeg, Canada;
Leo J. Sharkey, Doyles Town, Pa.

[73] Assignee: Costal Sales Associates, Inc.

[*] Notice: This patent issued on a continued prosecution application filed under 37 CFR 1.53(d), and is subject to the twenty year patent term provisions of 35 U.S.C. 154(a)(2).

[21] Appl. No.: 08/959,556

[22] Filed: Oct. 28, 1997

[51] Int. Cl.[7] .................................................. B27B 21/00
[52] U.S. Cl. .................................. 30/506; 30/512; 30/513
[58] Field of Search .............................. 30/506, 512, 513

[56] References Cited

U.S. PATENT DOCUMENTS

| | | | |
|---|---|---|---|
| 2,335,141 | 11/1943 | Blum | 30/513 |
| 2,435,964 | 2/1948 | Graff | 30/513 |
| 2,546,660 | 3/1951 | Wilcox | 30/513 |
| 2,553,300 | 5/1951 | Clemson | 30/513 |
| 2,667,195 | 1/1954 | Kilmer | 30/506 |
| 2,734,536 | 2/1956 | Harper | 30/506 |
| 2,910,101 | 10/1959 | Canfield | 30/506 |
| 3,060,983 | 10/1962 | Andreasson | 30/513 |
| 3,191,648 | 6/1965 | Dustrude | 30/506 |
| 3,329,187 | 7/1967 | Cowley | 30/513 |
| 3,954,127 | 5/1976 | Doxon | 30/506 |
| 4,186,785 | 2/1980 | Bilsback | 30/506 |
| 4,580,344 | 4/1986 | Jinghage et al. | 30/512 |
| 5,067,190 | 11/1991 | Gagnon | 7/149 |
| 5,440,816 | 8/1995 | Dustrude | 30/506 |
| 5,590,473 | 1/1997 | Wang | 30/506 |

FOREIGN PATENT DOCUMENTS

| | | | |
|---|---|---|---|
| 132974 | 8/1902 | Germany . | |
| 630 | of 1883 | United Kingdom | 30/512 |

*Primary Examiner*—M. Rachuba
*Attorney, Agent, or Firm*—Schmeiser, Olsen & Watts; Jared S. Goff

[57] ABSTRACT

A collapsible saw has a mechanism for releasably tensioning and locking a saw blade into position while also conferring lateral support for the blade, namely a cam lock mechanism. Additionally, a long channel member, a short member, and a saw blade are each pivotably connected in the saw assembly. The long and short member pivot connection is releasable in a manner that allows the long and short member to nest one within the other along with the saw blade. A collapsible saw according to the present invention is highly compact and entirely interconnected such that loss of saw parts is not a concern. Another feature of the saw is that its interconnections and design yield a configuration that can be quickly expanded into an operative configuration or place in a collapsed configuration.

20 Claims, 9 Drawing Sheets

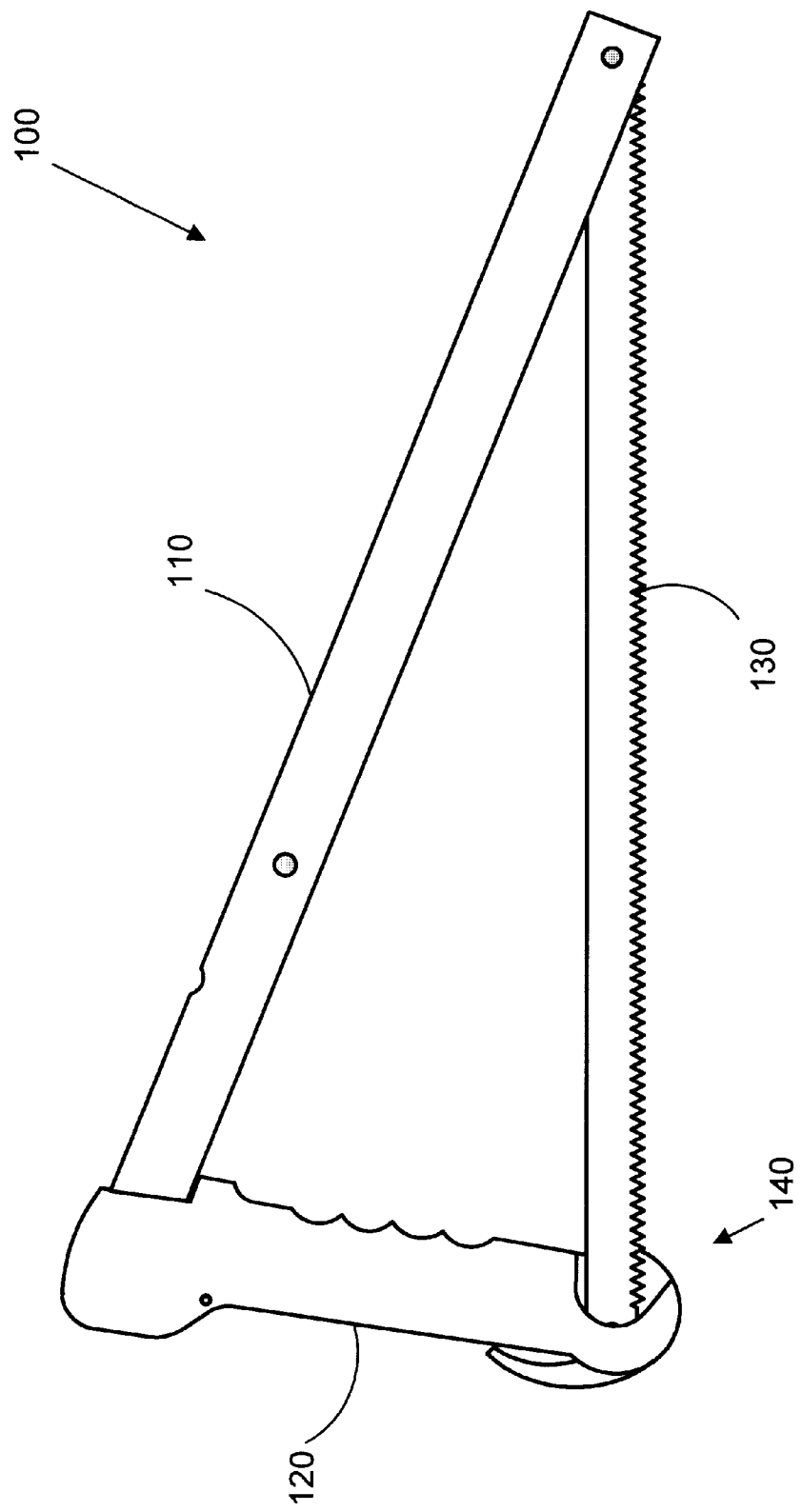

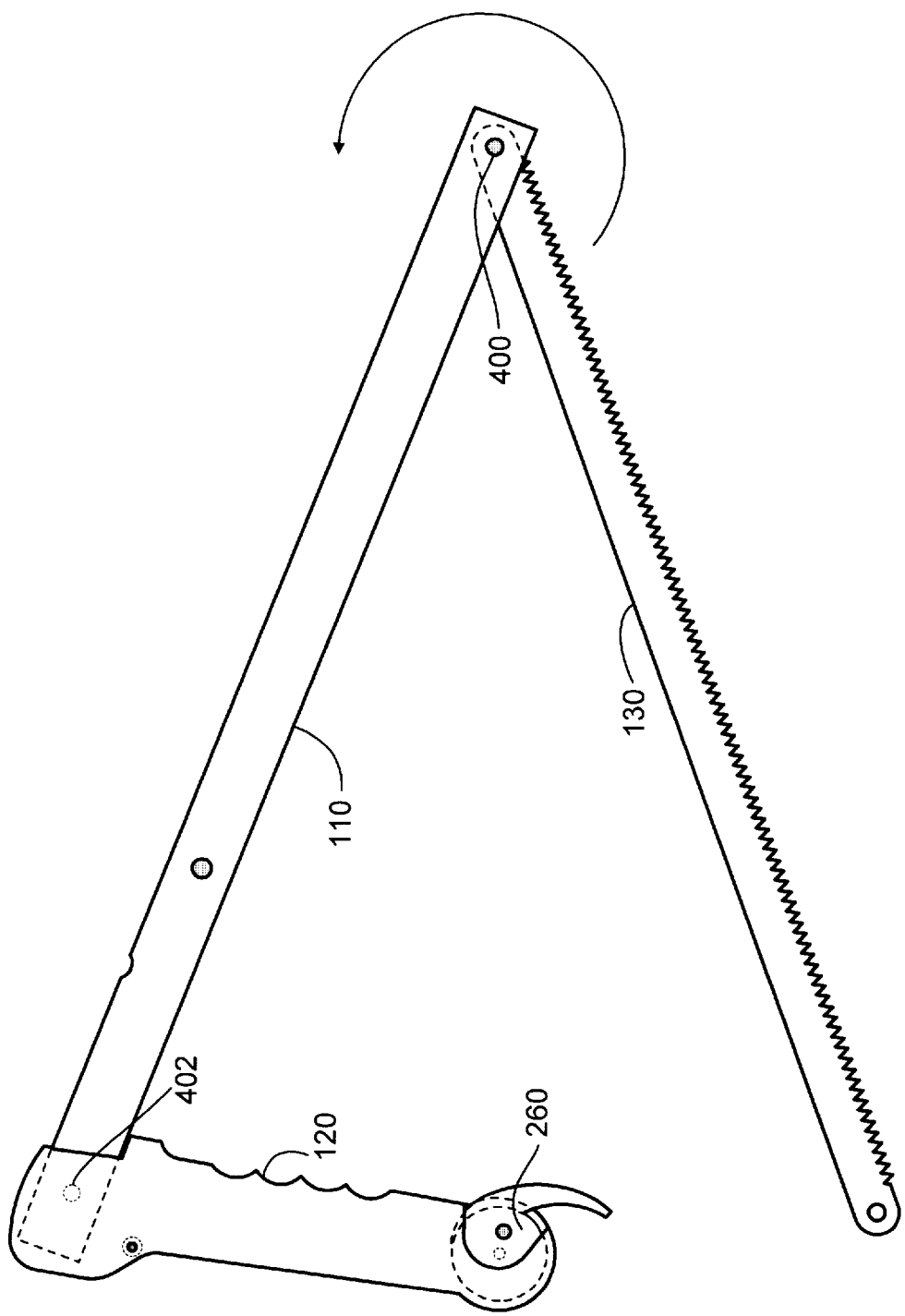

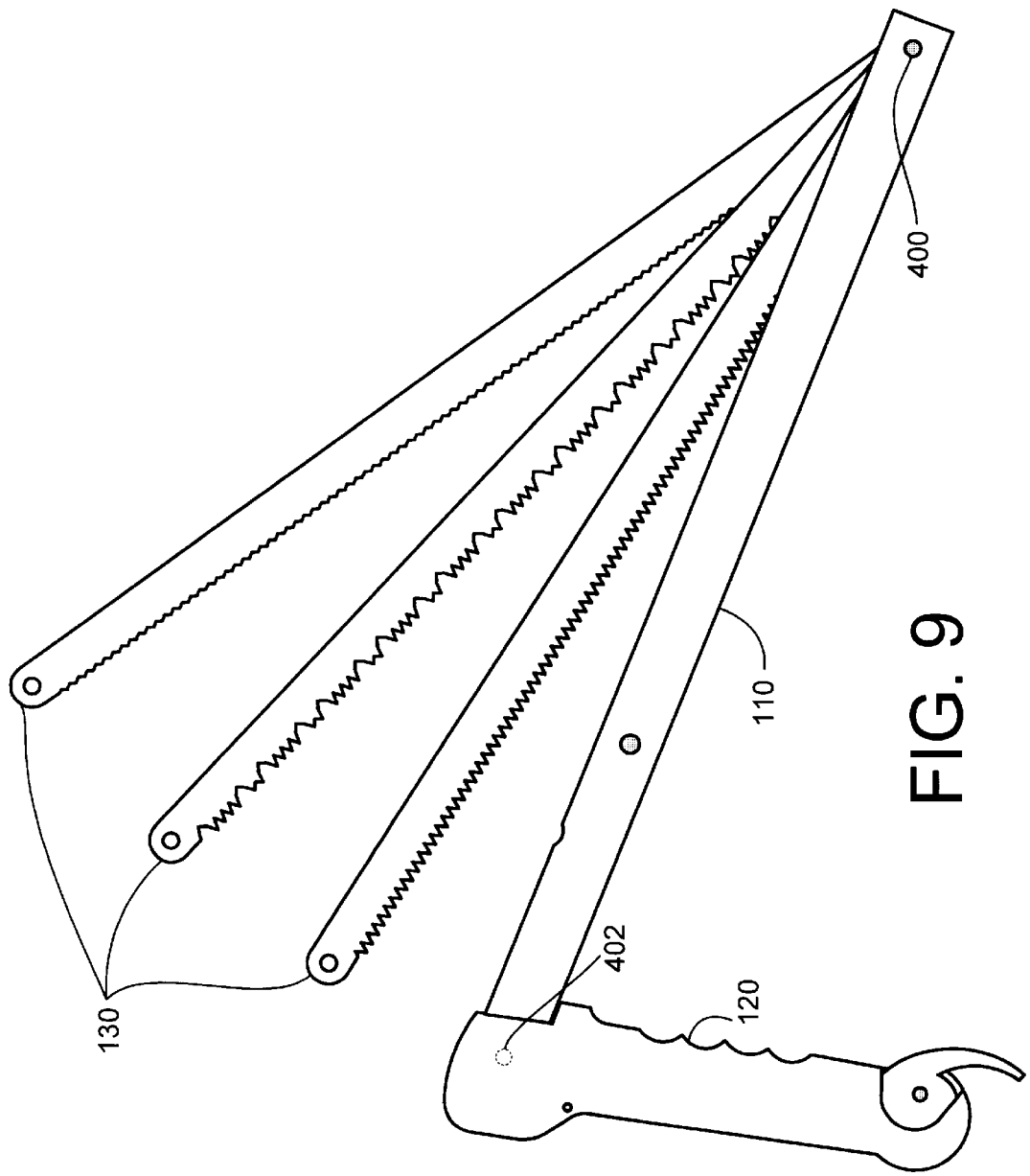

COLLAPSIBLE SAW

BACKGROUND OF THE INVENTION

1. Field of the Invention

The invention relates to the field of cutting implements. More particularly, the invention is a collapsible saw specially adapted to lock and to stabilize the blade into an operative configuration. The saw collapses into a compact unit for easy handling, transport, and storage.

2. Description of Related Art

There are a number of different types of collapsible saws commonly available. These saws are often used by campers, hunters or others who require a cutting tool that can be folded into a compact form to facilitate its handling, transport, and storage. U.S. Pat. No. 4,580,344 issued to Jinghage et al., U.S. Pat. No. 5,067,190 issued to Gagnon, and German Patent No. 132,794 issued to Schippert each describe a collapsible saw. The prior art consists primarily of two types of collapsible saws. The first type involves assembling multiple members interconnected by fittings, bolts, and pivot pins as in Gagnon and Schippert, where tightened bolts secure the assembly together. The second type involves assembling multiple members interconnected by pivot pins as in Jinghage et al., where the tension between the interconnections themselves secures the assembly together without any bolts.

For saws of the first type, changing the saw from a collapsed configuration to an operative configuration requires first disassembling the saw from its collapsed configuration. The disassembly may involve removing the collapsed saw from a carrying case, unscrewing bolts, or both. A requirement to unscrew bolts in disassembly of a saw from its collapsed configuration can be a tedious step precedent to placing the saw in its operative configuration. The bolts may adequately secure a saw in the collapsed configuration, but present an obstacle to disassembly. A user may have to carry tools along with the saw, presenting an additional obstacle. A carrying case may also adequately secure the parts of a saw in a collapsed configuration, but adds to the bulk of the collapsed saw. Furthermore, often a carrying case is needed to protect users from being cut by an exposed blade during handling, transport, or storage. Also, the collapsed saw may consist of multiple, separated parts that must be placed in a carrying case to avoid misplacement or loss of a part. Once removed from their carrying case, some collapsed saws include a frame held together with pivot pins and are essentially "unfolded" into a position where a blade can then be attached. Other collapsed saws include multiple parts that are joined by interlocking fittings rather than pivot pins. Still other saws include both pivot pins and interlocking fittings.

All collapsible saws of the first type use one or more bolts which must be tightened, usually in association with attaching the blade to the frame, to secure the assembly together. Once the blade is attached, it must be secured in place either by directly bolting the blade to the frame or by bolting the frame into a position that applies tension to the blade. Applying tension to the blade is needed both to hold the assembly together in the operative configuration and to prevent the blade from bending or twisting during use. Bending or twisting of the blade may create several problems such as increased difficulty in cutting, increased likelihood of blade breakage, and increased likelihood of injury to the user as a result of the difficult cutting or blade breakage. If cutting is difficult because of a bending or twisting blade, then a user will have to apply more force to the cutting motions and any sudden slip of the user's grip or of the saw blade is more likely to injure the user or damage the saw. Similarly, if a blade suddenly breaks because of a bending or twisting blade, then the user could be injured or the saw could be damaged, especially if the user is applying more force because of difficulty in cutting. Accordingly, it is important in collapsible saws to maintain sufficient blade tension such that the user is not injured and the saw is not damaged.

However, a blade that is over tightened also creates problems. Essentially, over tightening a blade will place some member of the saw into a state of critical stress such that the member deforms, cracks, breaks, or is otherwise damaged. The affected member may be a joint, a fitting, or even the blade. Whatever the damage and the particular member affected, additional force placed on the saw during use can result in sudden and undesired collapse of the saw and potential injury to the user. Over tightening is a particular problem among saws which require a wrench, screwdriver, or other tool to tighten bolts, since it is easy for a user to overestimate the tension required. Manufacturers may attempt to overcome the hazards of over tightening by constructing a frame capable of withstanding high stresses, however, it is usually desirable for a collapsible saw to be lightweight in addition to being compact. High stress construction often yields a saw heavier in weight.

The second type of collapsible saw, with members interconnected by pivot pins only and tension between interconnections securing the assembly, overcomes the problems discussed above, but may possess other problems. The second type of saw generally requires less time and effort to disassemble the saw from a collapsed configuration and reassemble it into an operative configuration. Because the saw uses only pivot pins, no tools are necessary and blade tension is generally predetermined by the manufacturer. Once the blade is locked into a predetermined position, dictating a predetermined tension, the saw is ready to use. Such a saw may also include an internal compartment for storing the blade while the saw is collapsed to prevent the need for a carrying case. Since the saw is entirely connected with pivot pins, there is likewise no need for a carrying case to prevent the loss of multiple, separated parts.

Unfortunately, the mechanical solutions to the problems of the first type of saw created new problems in the second type of saw. In prior art collapsible saws, connection of all the saw members with pivot pins eliminated loss of separated parts and tensioning problems, but forced the saw to be less compact. When the saw is in a collapsed configuration, the members are folded against one another rather than nested within one another so the collapsed saw is more bulky. Such a folded, rather than nested, configuration is mandated by the prior art interconnection with pivot pins. According to the prior art, nesting could take place if a pin was replaced with a bolt, but then an extra assembly step and a separated part would be present.

Thus, it can be seen from the above discussion that it would be an improvement in the art to provide a collapsible saw of the second type which resolved the problems of the first type of saw as well as the problems created by prior art saws of the second type. Specifically, this means providing a collapsible saw that connects the saw members with pivot pins, but still collapses into a nested arrangement. It would also be an improvement for a collapsible saw to include multiple blades in the nested arrangement.

SUMMARY OF THE INVENTION

According to the present invention a collapsible saw with a tensioning mechanism and a safety lock is disclosed. The collapsible saw of the present invention includes a long channel member that forms the back of the saw and also acts as a magazine for one or more saw blades. Each saw blade is pivotably connected to a distal end of the long channel member and is capable of being pivoted out of the long channel member via an elongated slot in said member. A short channel member is pivotably connected at its pivot end to a pivot end of the long channel member. When the saw is in its operative configuration, the saw blade is attached to and extends between the distal end of each of the two channel members to create a saw that has a basically triangular configuration.

A cam is pivotably engaged with the distal end of the short channel member and functions to releasably secure a distal end of the saw blade to the distal end of said short channel member. Once the blade is placed in a cam seat and attached to a cam pin, the cam is rotated using a cam lever. As the cam rotates, it draws the blade and two channel members to a point of maximum tension and then gradually releases the tension until the cam lever comes to rest against the short channel member. Sufficient residual tension remains in the blade such that it is operative. The residual tension keeps the cam in its rotated position, preventing the blade from slipping out. Also, as the cam rotates, the blade enters a cam slot which prevents the blade from sliding off the cam pin and provides lateral support for the blade.

In addition to the short channel member being pivotably connected to the long channel member, the pivot end of the short channel member is releasably engaged with the long channel member. The collapsible saw is placed in a collapsed configuration by disconnecting the blade from the cam and rotating the blade about its pivot end until the blade comes to rest in the magazine of the long channel member. Next, the short channel member is rotated about its pivot end until the longitudinal axes of the two channel members are parallel. Once in the parallel position, the long channel member may slide into the short channel member. The long channel member is locked within the short channel member by engaging a securing pin of the short channel member into a securing recess in the long channel member.

It is an advantage of the present invention that the nested arrangement possesses a safety lock.

It is a further advantage that the saw members are connected with pivot pins, but still collapse into a nested arrangement.

It is a still further advantage that the saw may include multiple blades pivotably connected within the nested arrangement.

The foregoing and other features and advantages of the present invention will be apparent from the following more particular description of preferred embodiments of the invention, as illustrated in the accompanying drawings.

BRIEF DESCRIPTION OF THE DRAWINGS

The preferred embodiments of the present invention will hereinafter be described in conjunction with the appended drawings, wherein like designations denote like elements, and:

FIG. 1 is a side elevation view of the collapsible saw in its operative configuration;

FIG. 4 is a side elevation view of the collapsible saw showing the beginning of the blade rotation about the pivot end of the blade;

FIG. 9 is a side elevation view of the collapsible saw showing three saw blades attached at the pivot end of the blade;

DESCRIPTION OF THE PREFERRED EMBODIMENTS

Figure 3:
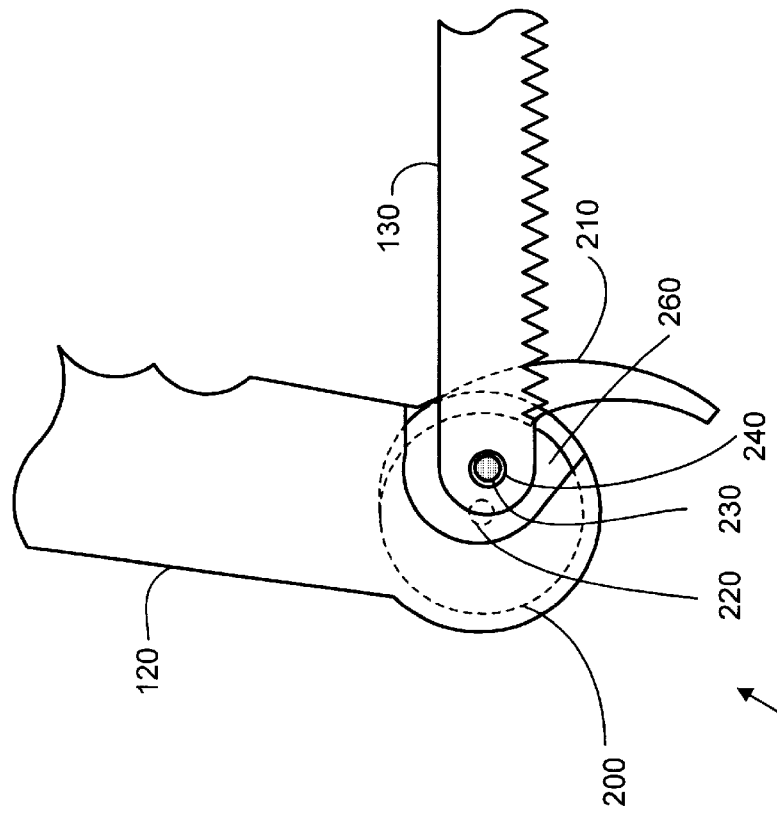
FIG. 3 is a close-up side elevation view of the cam after unlocking the cam prior to putting the collapsible saw into its collapsed configuration.

According to the present invention, a collapsible saw 100 is disclosed. The collapsing feature of a saw according to the present invention possesses substantial improvements over prior collapsible saws. One embodiment of a collapsible saw according to the present invention is described in FIG. 1. The collapsible saw 100 comprises a long channel member 110, a short channel member 120, a saw blade 130, and a cam lock mechanism 140. The two channel members and blade are arranged in a triangular shape with the short channel member 120 operating as a handle for the user and the long channel member 110 operating as the back of the saw. Since the long channel member 110 also acts as a magazine for the saw blade 130, the long channel member should be equal or greater in length than the saw blade so that the blade will fit within the long channel member. It is preferred that the triangular shape of the saw substantially resemble an isosceles triangle with the long channel member 110 and blade 130 being substantially equal in length. If the saw resembles an isosceles triangle in the manner suggested, then the angle between the short channel member and the blade will always be less than 90°. By making the angle less than 90°, it will be simple for a user simultaneously to provide both downward force and forward motion of the saw while holding it in only one hand. If the angle is 90° or greater, then a user may still provide forward motion with one hand, but will probably have to apply downward force using the other hand on the back of the saw so that the saw is urged downward simultaneous with the forward motion. The short channel member 120 can be any length. However, as inferred by its name, it is preferred that the short channel member 120 be shorter than the long channel member 110. It is most preferred that the short channel member 120 be between ⅓ and ⅔ of the length of the long channel member 110.

Figure 2:
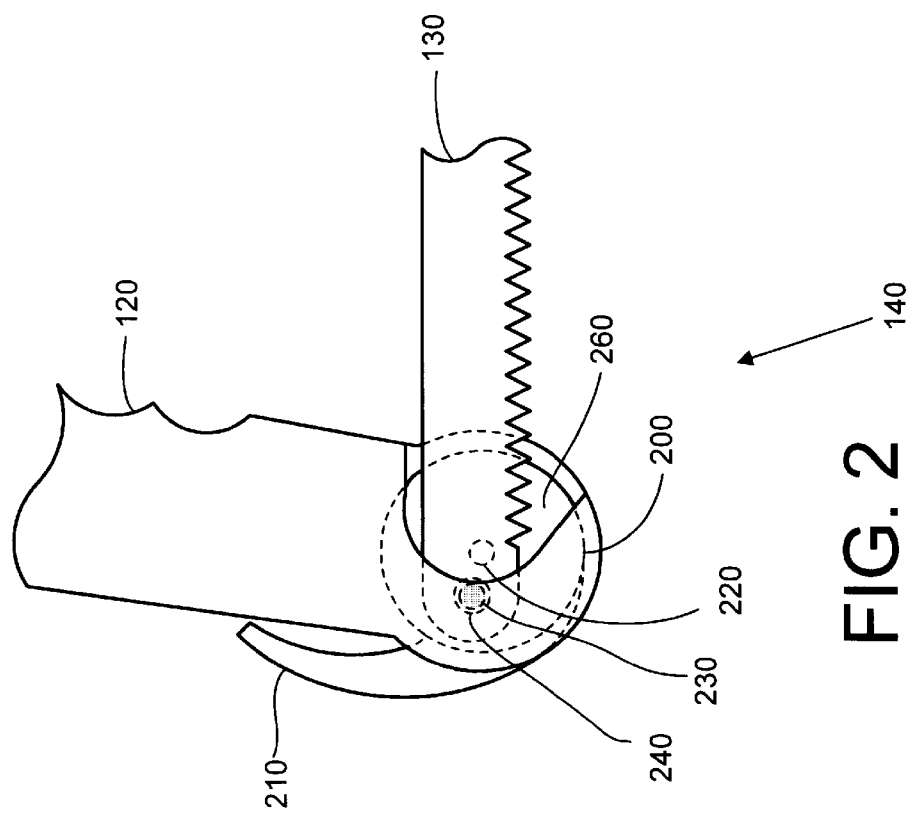
FIG. 2 is a close-up side elevation view of the cam while the collapsible saw is in its operative configuration.

The cam lock mechanism 140 serves multiple purposes in the present invention. The two channel members 110, 120 and the blade 130 are interconnected at the vertices of the triangle formed by the saw, with the cam lock 140 manipulating one of the interconnection points. The cam lock 140 applies tension to the blade 130, which helps prevent the blade from slipping out of the interconnection and from twisting. FIG. 2, shows the cam lock mechanism 140 in its closed position indicating that the saw is in its operative configuration. The cam lock mechanism 140 comprises a cam wheel 200 and a cam lever 210 rotatably connected to the distal end of the short channel member. The rotatable connection is implemented such that movement of the cam lever 210 about the longitudinal axis of the cam post 220 will also impart movement of the cam wheel 200 about the axis of the cam post. The saw blade 130 is connected to the cam wheel 200 by a cam pin 230 placed through a hole 240 near the end of the saw blade. The cam pin 230 is positioned on the cam wheel such that it is offset from the rotational axis of the cam wheel. The offset position operates both to tension the blade and to lock the two channel members and blade into a rigid assembly so that the saw is placed in an operative configuration.

FIG. 3 shows the cam lock mechanism in its open position indicating that no tension is applied to the blade and that the saw may be placed in its collapsed configuration. The cam lock open position is obtained by rotating the cam lever 210 counter-clockwise (in FIG. 3) about the axis of the cam post 220. The cam pin 230 is positioned such that, as the cam lever 210 is rotated, increasing tension will be applied to the blade. The change in tension corresponds to the force necessary to release the cam lock 140 from its closed position (FIG. 2) into its open position (FIG. 3). The tension that exists in the blade prior to rotating the cam lock 140 out of its closed position must be sufficient to keep the blade and two channel members in a rigid arrangement during use. Unless the needed force is applied to rotate the cam lever 210 and release the cam lock 140, the saw remains in its operative configuration. Once the open position is attained, no tension will remain in the blade or two channel members.

It is preferred that a standard length saw blade is first selected and the dimensions of the two channel members are then selected to yield the locking effect described above. Selecting a standard length saw blade allows for economical replacement of blades after they become dull. It is important for a manufacturer of the collapsible saw to predetermine the appropriate amount of closed position tension that will keep the saw rigid and fabricate the two channel members accordingly. Similarly, a manufacturer must predetermine the appropriate amount of tension that a user must overcome to release the cam lock 140 from its closed position (FIG. 2) and then position the cam pin 230 accordingly. If the force required to release the cam lock is too great, then the tension applied to the saw may cause damage to one of the saw components. Also, if the force required is to little, then the cam lock may abruptly slip out of its closed position. Fabrication of the saw with these concepts in mind eliminates the possibility that a user will over tighten the saw blade and, nevertheless, allows the saw to easily assume a rigid arrangement.

With the saw in the open position, the blade is placed in a cam recess 260, located in the face of the distal end of the short channel member, and the cam pin 230 is placed through the hole 240 near the end of the saw blade 130. When the cam lever 210 is rotated clock-wise, the blade 130 enters a cam slot (shown in FIG. 8 discussed below) in the cam lock mechanism 140 beginning at the edge of the cam recess 260. As the cam lock 140 is moved from its open position (FIG. 3) to its closed position (FIG. 2), the final placement of the closed position is determined when the cam lever 210 comes to rest against the short channel member 120. Prior to fabrication of the cam wheel, it is important for the manufacturer to determine how large of a cam slot is desired in the cam wheel. The size of the slot chosen will determine the position of the cam pin 230 relative to the cam post 220.

Figure 5:
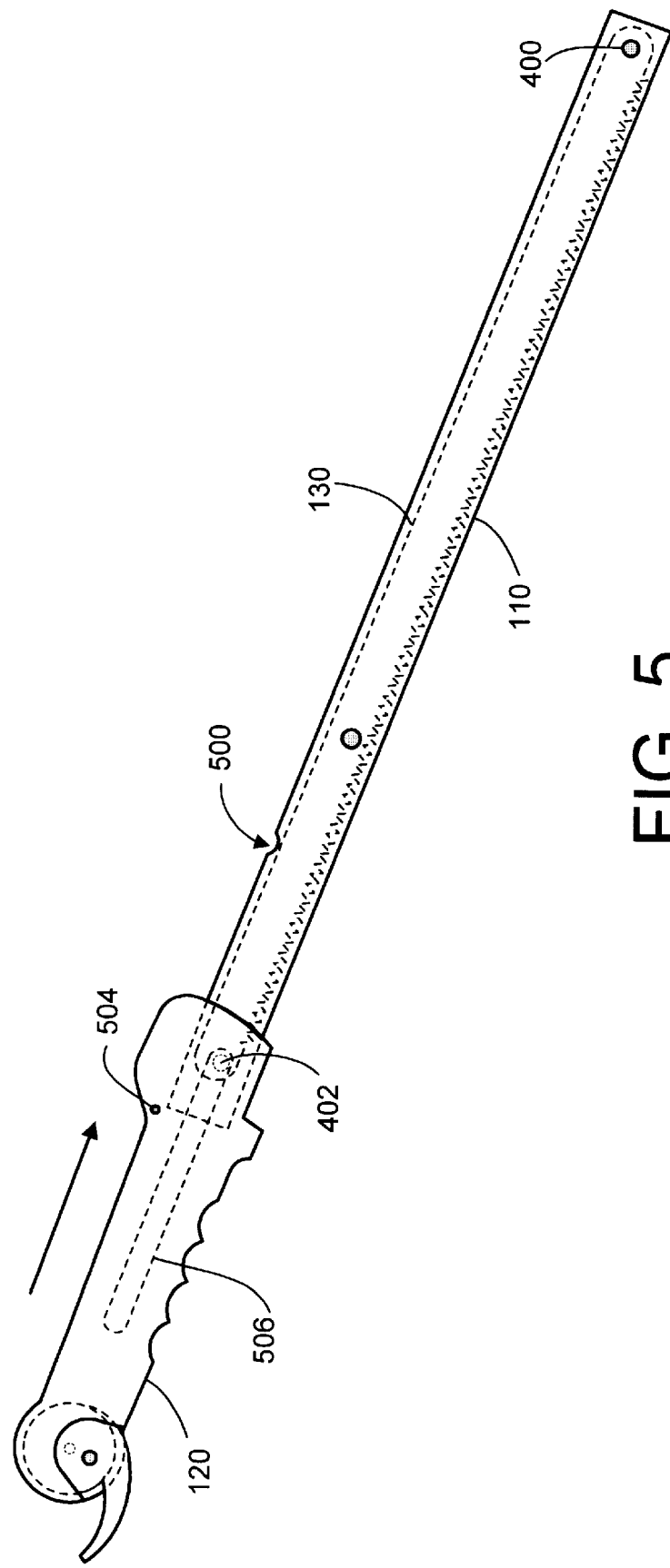
FIG. 5 is a side elevation view of the collapsible saw showing the blade stowed in the long channel member after rotation about the pivot end of the blade with the long channel member positioned to slide into the short channel member.

As discussed above, the first step in collapsing a saw according to the present invention is to rotate the cam lock from the closed to the open position. FIG. 4 shows the second step of removing the blade 130 from the cam recess 260 and rotating it about the pivot pin 400 of the long channel member 110. The pivot pin 400 may be any number of prior art pins or clips allowing the blade 130 to rotate about the distal end of the long channel member and possessing sufficient strength to retain the blade during assembly and use of the saw. Preferably, pivot pin 400 is removable so that the blade may be replaced. As shown in FIG. 5, the blade 130 is rotated completely around the distal end of the long channel member 110 until it comes to rest inside the long channel member.

Figure 6:
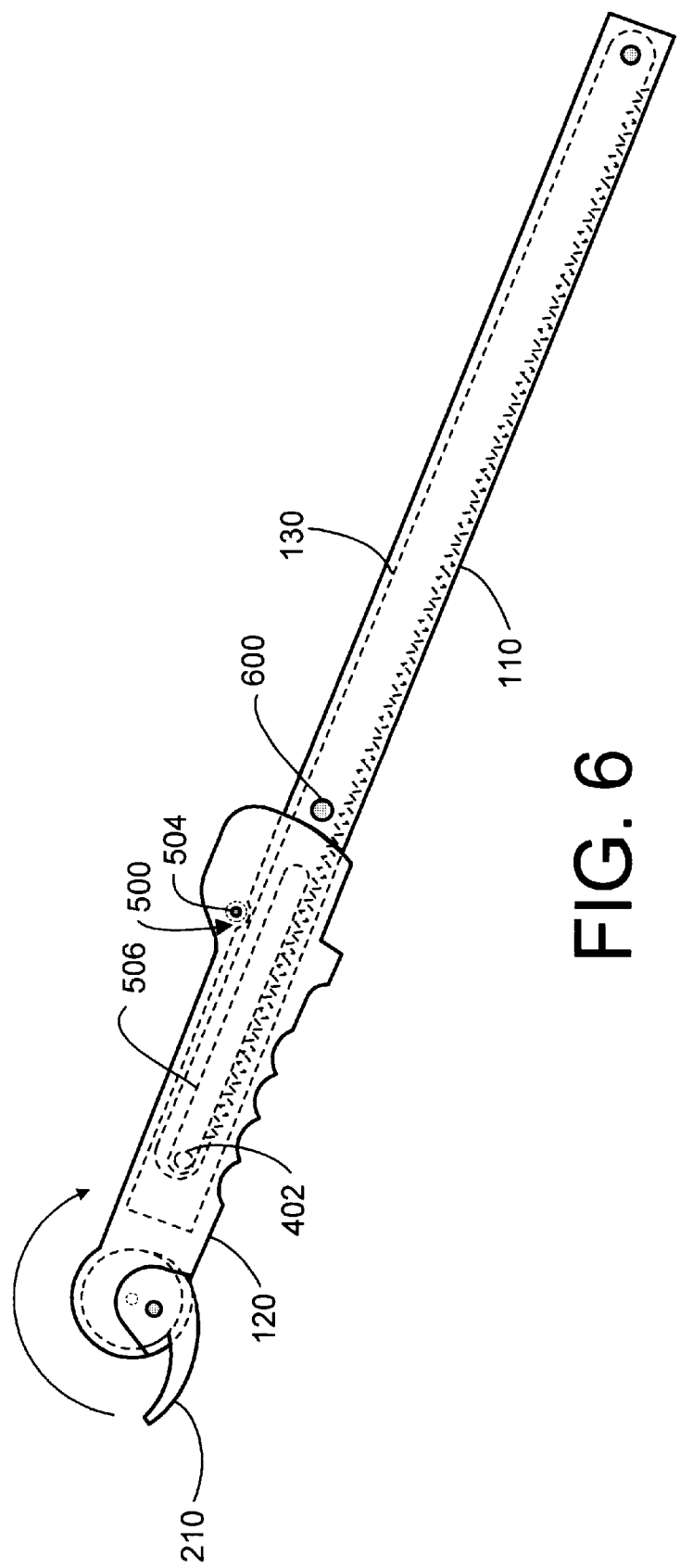
FIG. 6 is a side elevation view of the collapsible saw in one collapsed configuration.
Figure 7:
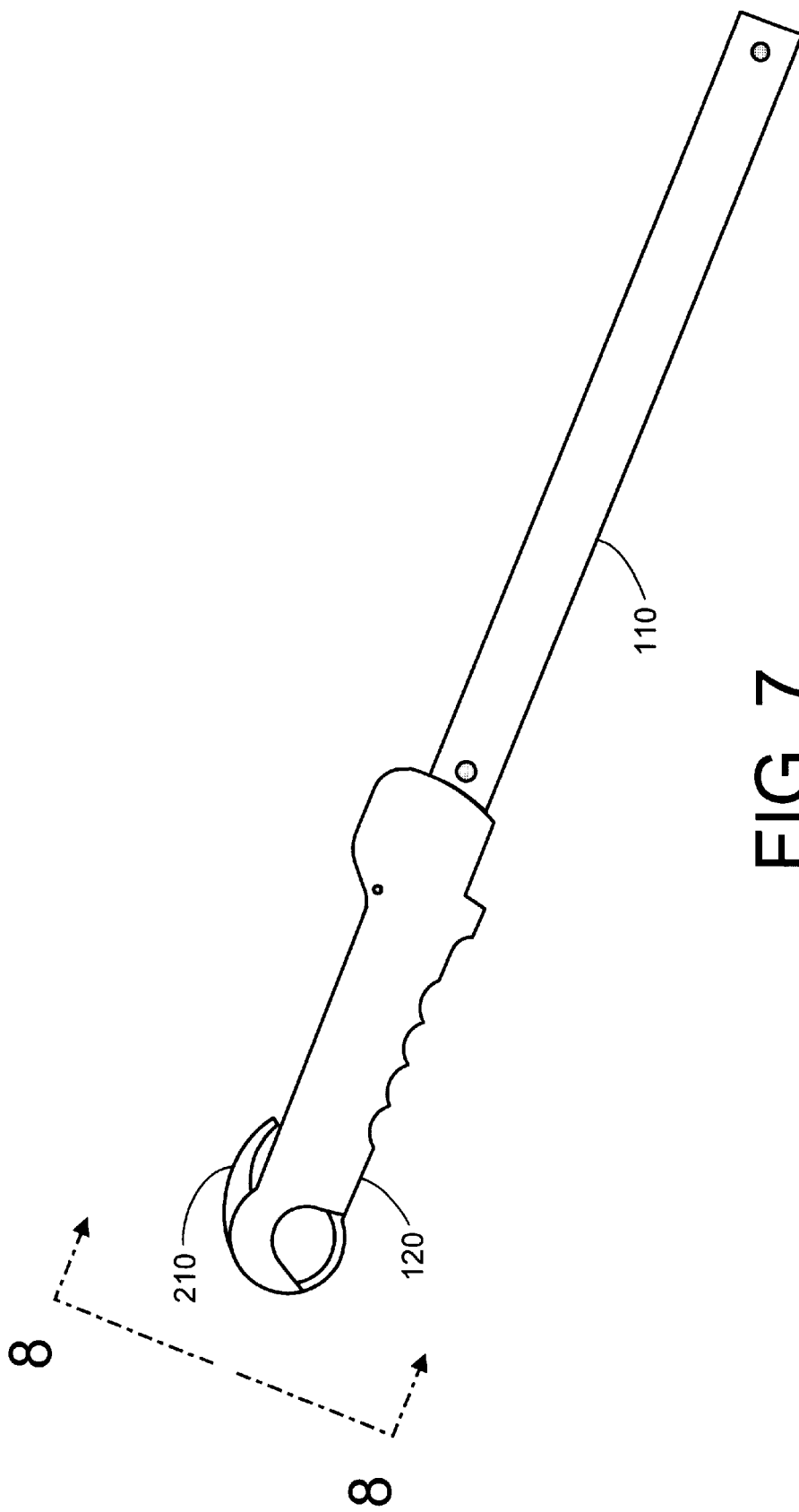
FIG. 7 is an side view of the collapsible saw in one completely collapsed configuration.

Similarly, as shown in FIG. 4, the short channel member 120 is rotated about the pivot end of the long channel member until it comes in alignment with the long channel member 110 as shown in FIG. 5. Pivot pin 402 releasably connects the pivot end of the long channel member to the pivot end of the short channel member. The two channel members are sized such that the long channel member 110 can slide into and nest within the short channel member 120 as shown in FIG. 6. The nested arrangement displayed in FIG. 6 further shows how the blade 130 may be secured within the assembly by tightening thumb screw 600. Preferably, the short channel member 120 also covers the channel opening in the long channel member 110 at least enough that it prevents the blade from pivoting out of the magazine. FIGS. 5 and 6 also show the relationship of securing recess 500 with securing pin mechanism 504 and the relationship of pivot pin 402 with pin groove 506 when the saw is placed in its collapsed configuration. The holes, pins, and groove are positioned and sized such that they will releasably secure the saw in both its operative and collapsed configuration when properly aligned. The pin groove 506 formed in the interior of the short channel member 120 allows the long channel member 110 having a protruding pivot pin 402 to nevertheless slide within the short channel member. Also, the pin groove 506 is sized to prevent the pivot pin 402 from sliding beyond the end of pin groove 506 when the long channel member 110 is extended from the nested arrangement. While the securing pin mechanism 504 is preferred, the advantages of the present invention may still be obtained in its absence. The securing pin mechanism 504 provides a nested arrangement that is better secured in a collapsed configuration than if the securing pin mechanism were absent. The nested and secured arrangement of the saw according to the present invention provides a more compact saw than conventionally available. Once the saw is collapsed, the cam lever 210 may be rotated into any orientation desired for storage. FIG. 7 shows one preferred orientation that minimizes the space required for storage of the saw.

Multiple embodiments exist for pivot pin 402 and securing pin mechanism 504. They could comprise unitary pins that are removed prior to placing the saw in its collapsed configuration and then reinserted to secure the nested arrangement. If unitary pins are selected then the position of holes and pins must be selected such that they do not interfere with nesting of the blade 130 within the long channel member 110 or the nesting of the long channel member within the short channel member 120. They could also comprise bolt and nut assemblies, screws, and spring-loaded pins capable of being compressed to release the connection.

Preferably, the pivot pin 402 comprises two machine screws wherein one screw is threaded into each side of the long channel member. The tip of each screw extends into the side wall of the long channel member only far enough to fasten it since, as shown in FIGS. 5 and 6, a gap must exist between the two screws to receive the saw blade 130 in the collapsed configuration. The head of each screw is sized in conjunction with the pin groove 506 such that the head will remain within the pin groove when the long channel member 110 is collapsed into and extended from the short channel member 120.

Figure 11:
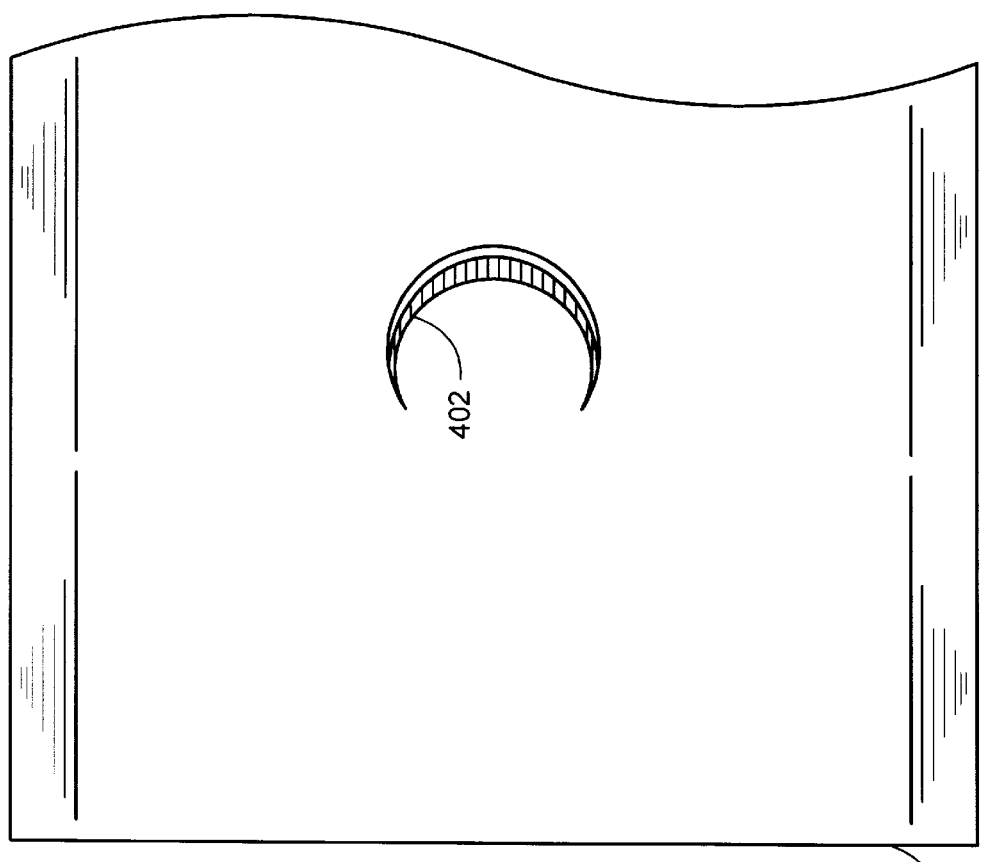
FIG. 11 is a side view of the long member pivot end and pivot pin.
Figure 10:
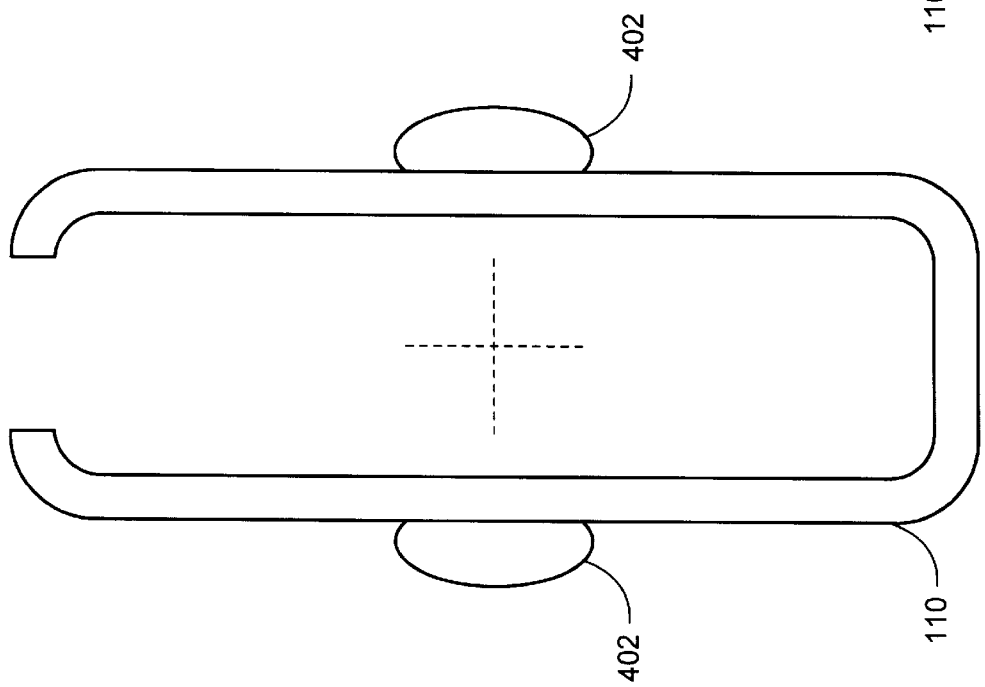
FIG. 10 is a end view of the long member pivot end and pivot pin.

More preferably, as shown in FIGS. 10 and 11, pivot pin 402 comprises an integral, dog-eared tab stamped out of each side wall of the long channel member 110. By making a semicircular cut in the side wall, a portion of the side wall material may be bent outward, forming a dog-eared tab that operates as a pivot pin 402. Depending on the method of fabrication, it may be possible simultaneously to stamp a semicircular cut in the side wall material and to push the cut portion sufficiently outward simply with the force of the stamping machine. Accordingly, an integral tab bears the advantage of minimal time and expense for fabrication. Alternatively, pivot pin 402 could comprise a post formed on an inner wall of short channel member 120, in which case, pin groove 506 would be formed in long channel member 110.

The pin groove 506 acts as a "track" for the pivot pin 402 so that extension of the long channel member will stop when the pivot pin contacts the end of the "track." The stopping point corresponds to the position wherein the short channel member can be rotated into its operative configuration. The screws or integral tabs will not become lost since they are attached to one of the channel members and provide a simple, inexpensive means for releasably connecting the long and short channel member.

Preferably, the securing pin mechanism 504 comprises a thumb button on the exterior of the short channel member interconnected to a spring-loaded pin on the interior of the short channel member. As the long channel member 110 collapses into the short channel member 120, the spring-loaded pin will snap into the securing recess 500 formed in the long channel member. To unlock and extend the long channel member, a user simply manipulates the thumb button to release the pin from the securing recess 500. The spring-loaded pin may also be fabricated without a thumb button. In such a configuration, the tip of the pin will move out of the securing recess when a predetermined amount of manual force is applied to extend the long channel member out of the collapsed configuration. When the long channel member is again collapsed, the pin automatically snaps back into place.

The appended figures show the pivot pin 402 associated with the long channel member and the securing pin mechanism 504 associated with the short channel member. However, the devices may alternatively be associated with the other channel member. If the pivot pin is attached to the short channel member, then a pin groove would be provided in the long channel member to achieve the same effects and advantages described above.

Figure 8:
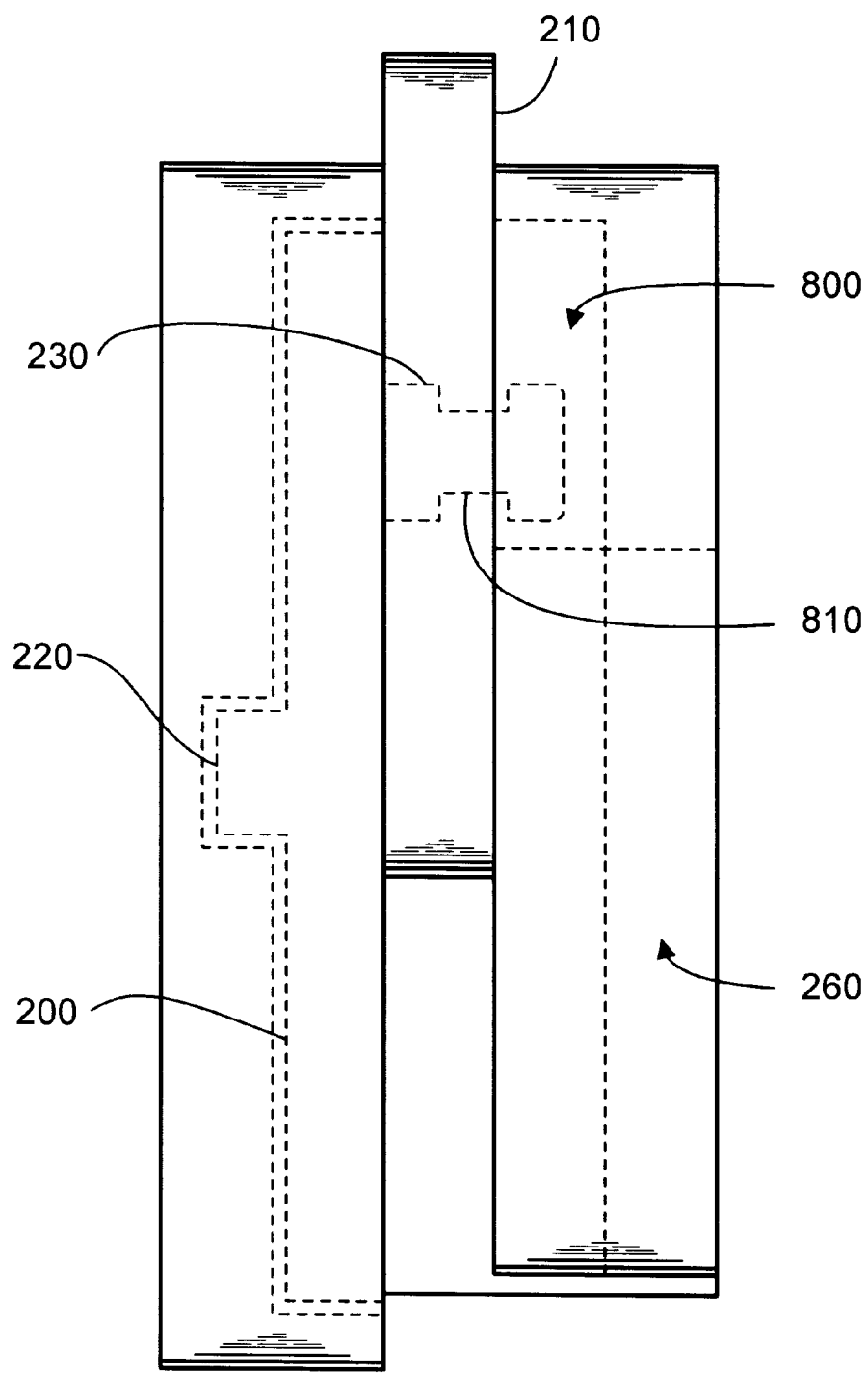
FIG. 8 is an end view of the collapsible saw shown in FIG. 7 taken along line 8—8.

FIG. 8 displays end view of the collapsible saw shown in FIG. 7 taken along line 8—8 or, more particularly, an end view of the cam lock mechanism 140. FIG. 8 shows from a different viewpoint the location of cam slot 800 and the cam post 220 and cam pin 230 on the cam wheel 200. The dimensions of the cam slot 800 are linked to the dimensions of the cam recess 260 (in preceding figures) and the location of the cam stop 250. If a more shallow slot is desired, that is, a slot covering less of the blade end, then the cam recess 260 will necessarily be larger. As the cam lock mechanism rotates from the open position (FIG. 3) with a blade in place to the closed position (FIG. 2), the blade slides into the cam slot 800, concealing the blade end and the cam pin 230. The portion of the cam mechanism 140 that covers the blade while it is engaged in the cam slot prevents the blade from slipping off the cam pin 230 and provides lateral support for the blade. An annular recess 810 around the circumference of the cam pin 230 also prevents the blade from slipping off the end of the cam pin.

The short channel member may comprise an open channel, a tube, or some other shape capable of having a channel for receipt of the long channel member and housing or connecting with a cam lock mechanism. In the preferred embodiment, the short channel member comprises two solid halves having various recesses for accommodating the elements described above. For example, when the two halves are placed together, one recess provides a channel for receipt of the long channel member 110. Other recesses rotatably house the cam wheel 200 and cam post 220, form the cam slot 800, cam recess 260, and pin groove 506, and house the securing pin mechanism 504. The preferred design of the short channel member 120 completely encloses the portion of the long channel member 110 collapsed therein, thus providing a comfortable grip for the user. Essentially, the short channel member then constitutes a partially hollow shaft. However, an arrangement is easily conceivable in which the short channel member is an open channel. The open faces of the channel members could be opposing or face the same direction when in the nested arrangement. The preferred opposing of channel members prevents the saw blades 130 from pivoting out of the magazine during handling, transportation, or storage.

Noticeably, FIG. 9 indicates a saw with three blades 130. The present invention may be practiced by including only one saw blade in the saw, multiple blades of the same type to provide replacement blades, or multiple blades of different types to increase the versatility of the saw.

While the invention has been particularly shown and described with reference to preferred embodiments thereof, it will be understood by those skilled in the art that various changes in form and details may be made therein without departing from the spirit and scope of the invention. Accordingly, unless otherwise specified, any dimensions of the apparatus indicated in the drawings or herein are given as an example of possible dimensions and not as a limitation.

What is claimed:

1. A saw comprising:
    a frame having at least one frame member, a first frame end, and a second frame end;
    at least one blade, the blade having a first blade end and a second blade end, wherein the first blade end is selectively attached to the first frame end, and wherein the second blade end defines a hole; and
    a cam lock having a lever connected to a wheel, the wheel having a rotational axis and being rotatably associated with said second frame end, and a pin mounted on the wheel off-center from the rotational axis of the wheel, said hole in said second blade end selectively receiving the pin, thus connecting the second frame end to the second blade end.

2. The saw of claim 1, said cam lock also having a slot in said second frame end capable of preventing said blade from slipping out of connection with the cam lock by at least partially receiving said pin and said second blade end when said hole in said second blade end receives said pin.

3. The saw of claim 1, wherein said first blade end is pivotably connected to said first frame end and said frame further comprises a magazine for storage of said blade without disconnecting the first blade end from the first frame end.

4. A collapsible saw comprising:
a frame having a long member with a pivot end and a first frame end and having a short member with a pivot end and a second frame end, wherein the long and short members are capable of being nested one within the other;
a pivot mechanism for pivotably and releasably connecting the long and short members at their pivot ends;
at least one blade, the blade having a first blade end and a second blade end, wherein the first blade end is selectively attached to the first frame end, the second blade end is selectively attached to the s econd frame end, the second blade end defines a hole, and disconnection of only the second blade end from the second frame end allows pivoting of the long and short members into a position where they may be nested one within the other in a collapsed configuration; and
a cam lock having a lever connected to a wheel, the wheel having a rotational axis and being rotatably associated with said second frame end, and a pin mounted on the wheel off-center from the rotational axis of the wheel, said hole in said second blade end selectively receiving the pin, thus connecting the second frame end to the second blade end.

5. The collapsible saw of claim 4, wherein said long member comprises a channel-shaped shaft having two side walls and an open face and said short member comprises a partially hollow shaft having two side walls.

6. The collapsible saw of claim 5, wherein said pivot mechanism comprises a pivot pin assembly having protrusions therefrom pivotably engaged in pivot recesses in said long or short member pivot end side walls.

7. The collapsible saw of claim 6, wherein said pivot pin assembly is two tabs, each formed integrally to one of said two side walls.

8. The collapsible saw of claim 7, wherein said tabs are formed integrally to the long member pivot end side walls and said two side walls of said short member have a pin groove capable of accommodating said pivot pin assembly when the long and short channel members are nested one within the other.

9. The collapsible saw of claim 4, further comprising a securing mechanism for releasably securing the long and short members when nested one within the other.

10. The collapsible saw of claim 9, wherein said securing mechanism comprises a securing pin assembly having a protrusion therefrom releasably engaged in a securing recess in said long member when the long and short members are nested one within the other.

11. A collapsible saw comprising:
a frame having a long member with a pivot end and a first frame end and having a short member with a pivot end and a second frame end, wherein the long and short members are capable of being nested one within the other;
a pivot mechanism for pivotably and releasably connecting the long and short members at their pivot ends; and
at least one blade, the blade having a first blade end and a second blade end, wherein the second blade end defines a hole, and wherein the first blade end is selectively attached to the first frame end and the second blade end is selectively attached to the second frame end; and
a cam lock mechanism for releasably tensioning and locking the blade, the cam lock mechanism selectively connecting the second frame end to the second blade end, wherein disconnection of only the second blade end from the second frame end allows pivoting of the long and short members into a position where they may be nested one within the other in a collapsed configuration, wherein said cam lock mechanism comprises a lever connected to a wheel, the wheel having a rotational axis and being rotatably associated with said second frame end, and a pin mounted on the wheel off-center from the rotational axis of the wheel, the pin comprising a first pin end mounted on the wheel and a second pin end distal from the first pin end, the second frame end having a slot capable of preventing said blade from slipping out of connection with the cam lock mechanism by at least partially receiving said pin and said second blade end when said hole in said second blade end receives said pin, wherein the slot is bounded bv a first wall and a second wall, and wherein the second wall is adjacent the second pin end and the second wall prevents the blade from slipping off the pin when the slot at least partially receives the pin and the second blade end.

12. The collapsible saw of claim 11, said slot having a slot depth, wherein the slot depth is sized to engage the pin completely.

13. The collapsible saw of claim 11, wherein said long member comprises a channel-shaped shaft having two side walls and an open face, said short member comprises a partially hollow shaft having two side walls, said first blade end is pivotably connected to said first frame end, and the long member is sized to operate as a magazine for storage of said blade.

14. The collapsible saw of claim 11, wherein said pivot mechanism comprises a pivot pin assembly having protrusions therefrom pivotably engaged in pivot recesses in said short member pivot end side walls.

15. The collapsible saw of claim 14, wherein said two side walls of said short member further comprise a pin groove capable of accommodating said pivot pin assembly when the long and short channel members are nested one within the other.

16. The collapsible saw of claim 11, further comprising a securing mechanism having a securing pin assembly with a protrusion therefrom releasably engaged in a securing recess in said long member when the long and short members are nested one within the other.

17. The collapsible saw of claim 1, wherein said pin defines an annular recess that receives said second blade end when said hole in said second blade end receives said pin.

18. The collapsible saw of claim 4, wherein said pin defines an annular recess that receives said second blade end when said hole in said second blade end receives said pin.

19. The collapsible saw of claim 11, wherein said pin defines an annular recess between said first pin end and said second pin end that receives said second blade end when said hole in said second blade end receives said pin.

20. A collapsible saw comprising:
a frame having a long member with a pivot end and a first frame end and having a short member with a pivot end and a second frame end, wherein said long and short members are capable of being nested one within the other, and wherein said long member comprises a channel-shaped shaft having two side walls and an open face and said short member comprises a partially hollow shaft having two side walls;

a pivot mechanism for pivotably and releasably connecting said long and short members at their pivot ends, said pivot mechanism comprising a pivot pin assembly having protrusions therefrom pivotably engaged in pivot recesses in said short member pivot end side walls, wherein said two side walls of said short member further comprise a pin groove capable of accommodating said pivot pin assembly when said long and short channel members are nested one within the other; and at least one blade, said blade having a first blade end and a second blade end, wherein said second blade end defines a hole, wherein said first blade end is selectively pivotally attached to said first frame end and said second blade end is selectively attached to said second frame end, and wherein said long member is sized to operate as a magazine for storage of said blade;

a cam lock mechanism for releasably tensioning and locking said blade, said cam lock mechanism selectively connecting said second frame end to said second blade end, wherein disconnection of only said second blade end from said second frame end allows pivoting of said long and short members into a position where they may be nested one within the other in a collapsed configuration, wherein said cam lock mechanism comprises a lever connected to a wheel, said wheel having a rotational axis and being rotatably associated with said second frame end, and a pin mounted on said wheel off-center from said rotational axis of said wheel, said pin comprising a first pin end abutting said wheel, a second pin end distal from said first pin end, and an annular recess between said first pin end and said second pin end that receives said second blade end when said hole in said second blade end receives said pin, said second frame end having a slot capable of preventing said blade from slipping out of connection with said cam lock mechanism by at least partially receiving said pin and said second blade end when said hole in said second blade end receives said pin, wherein said slot is bounded by a first wall and a second wall, and wherein said second wall is adjacent said second pin end and said second wall prevents said blade from slipping off said pin when said slot at least partially receives said pin; and a securing mechanism having a securing pin assembly with a protrusion therefrom releasably engaged in a securing recess in said long member when said long and short members are nested one within the other.

* * * * *